US010075896B2

(12) United States Patent
Kim et al.

(10) Patent No.: US 10,075,896 B2
(45) Date of Patent: Sep. 11, 2018

(54) SERVICE PROVIDING METHOD USING A BEACON AND ELECTRONIC APPARATUS THEREOF

(71) Applicant: Samsung Electronics Co., Ltd., Gyeonggi-do (KR)

(72) Inventors: Yongwook Kim, Seoul (KR); Dong-Hoon Kim, Gyeonggi-do (KR); Byoung-Joo Kim, Seoul (KR); Dongouk Moon, Gyeonggi-do (KR); Tai Ho Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/178,655

(22) Filed: Jun. 10, 2016

(65) Prior Publication Data

US 2016/0381621 A1 Dec. 29, 2016

(30) Foreign Application Priority Data

Jun. 26, 2015 (KR) ........................ 10-2015-0091410

(51) Int. Cl.
| | | |
|---|---|---|
| *H04W 40/24* | (2009.01) | |
| *G06Q 30/02* | (2012.01) | |
| *H04W 4/021* | (2018.01) | |
| *H04L 29/08* | (2006.01) | |
| *H04M 1/725* | (2006.01) | |
| *H04W 4/80* | (2018.01) | |

(52) U.S. Cl.
CPC ...... *H04W 40/244* (2013.01); *G06Q 30/0241* (2013.01); *H04L 67/303* (2013.01); *H04M 1/72583* (2013.01); *H04W 4/021* (2013.01); *H04W 4/80* (2018.02)

(58) Field of Classification Search
CPC ... H04W 40/244; H04W 4/008; H04W 4/021; H04W 4/80; G06Q 30/02; G06Q 30/0241; G06Q 30/0276; H04L 67/303; H04M 1/72583
See application file for complete search history.

(56) References Cited

U.S. PATENT DOCUMENTS

| | | | |
|---|---|---|---|
| 6,122,520 A | 9/2000 | Want et al. | |
| 8,781,502 B1 | 7/2014 | Middleton et al. | |
| 2014/0254466 A1* | 9/2014 | Wurster | ............... H04L 12/189 370/312 |
| 2014/0273857 A1 | 9/2014 | White et al. | |
| 2015/0140982 A1* | 5/2015 | Postrel | ................. H04W 4/008 455/418 |
| 2015/0181384 A1* | 6/2015 | Mayor | ................. H04W 24/02 455/456.1 |
| 2015/0350189 A1* | 12/2015 | Shin | ..................... H04W 12/06 726/29 |
| 2016/0156638 A1* | 6/2016 | Somani | ................... H04L 63/12 726/7 |
| 2016/0171486 A1* | 6/2016 | Wagner | ................. G06Q 20/12 705/39 |

FOREIGN PATENT DOCUMENTS

| | | |
|---|---|---|
| WO | 2015/004477 A1 | 1/2015 |
| WO | 2015/061673 A1 | 4/2015 |

OTHER PUBLICATIONS

European Search Report dated Feb. 17, 2017.
European Search Report dated Jul. 26, 2017.
European Search Report dated Aug. 16, 2016.
European Search Report dated Mar. 9, 2018.

\* cited by examiner

*Primary Examiner* — Walli Butt
(74) *Attorney, Agent, or Firm* — Cha & Reiter, LLC.

(57) ABSTRACT

A method for use in an electronic device includes: receiving, from a server, beacon information including a first function information. The first function information is associated with a first function, and the first function is executed in response to detecting that a beacon signal that is received from a beacon transmitter matches beacon information.

18 Claims, 16 Drawing Sheets

| Command | OCF | Command parameters | Return Parameters |
|---|---|---|---|
| HCI_LE_Set_Advertising_Parameters | 0x0006 | Advertising_Interval_Min, Advertising_Interval_Max, Advertising_Type, Own_Address_Type, Direct_Address_Type, Direct_Address, Advertising_Channel_Map, Advertising_Filter_Policy | Status |

FIG.6

Beacon Information (900)

| NO | Column name | description |
|---|---|---|
| 1 | Service (901) | USED TO IDENTIFY ID ACCORDING TO SERVICE |
| 2 | Version (902) | USED TO NOTIFY DEVICE UPDATING BY RAISING VERSION WHEN SERVICE PROVISION INFORMATION CHANGES |
| 3 | Validation_DATE (903) | ALSO CHECK VALIDATION DATE WHEN RETRIEVING INFORMATION LIST, AND UPDATE AGAIN WHEN PASSING CORRESPONDING TIME. WHEN NEW BEACON IS DISCOVERED BUT NEW BEACON INFORMATION IS NOT OBTAINED THROUGH SERVER COMMUNICATION, ADDITIONALLY SET TIME SO AS NOT TO ACCESS SERVER THOUGH NEW BEACON IS FOUND DURING CERTAIN TIME. |
| 4 | Beacon ID (904) | BEACON UUID(unique user identifier) |
| 5 | Beacon Name (905) | NAME WHEN SHOWING BEACON TO USER |
| 6 | action (906) | INSERT ACTION INFORMATION WHEN PARTICULAR ACTION IS REQUIRED IN BEACON DISCOVERY |
| 7 | display information (907) | INSERT DISPLAY INFORMATION WHEN PARTICULAR SCREEN IS DISPLAYED IN BEACON DISCOVERY |

FIG.9

Beacon Information List (1000)

| NO | Service ID | Version | Validation_DATE | Beacon ID | Beacon Name | action | display |
|----|------------|---------|-----------------|-----------|-------------|--------|---------|
| 1 | 0x03 | 0x02 | 20150620 | 0xDD39E636F2E9 | SAMSUNG TV | REMOTE CONTROL | NOTIFY REMOTE CONTROL FOUND |
| 2 | 0x04 | 0x01 | 20150710 | 0xAB40E637F3E2 | SAMSUNG AIR CONDITIONER | AIR CONDITIONER OPERATING | NOTIFY AIR CONDITIONER OPERATING |
| ... | ... | ... | ... | ... | ... | ... | ... |

FIG.10

SERVICE PROVIDING METHOD USING A BEACON AND ELECTRONIC APPARATUS THEREOF

CLAIM OF PRIORITY

The present application claims the benefit under 35 U.S.C. § 119(a) to a Korean patent application filed in the Korean Intellectual Property Office on Jun. 26, 2015, and assigned Serial No. 10-2015-0091410, the entire disclosure of which is hereby incorporated by reference.

TECHNICAL FIELD

The present disclosure relates generally to a service providing method using a beacon and an electronic device thereof.

BACKGROUND

As an alternative to Near Field Communication (NFC) which is a short-range wireless communication, Bluetooth Low Energy (BLE) beacon using BLE is suggested. The BLE beacon provides location information and is commercialized in various fields including marketing, purchase, and automatic check-in.

An effective communication distance of the NFC is limited to about 4~20 cm, whereas an effective communication distance of the NFC is expanding from about 5 cm~50 m. The NFC needs to install a separate chip in every mobile communication terminal, whereas the BLE beacon enables the short-range wireless communication using a beacon merely with a BLE recognition function. Accordingly, the BLE beacon is more economical than the NFC and offers a wireless communication service even in a wide indoor space.

The recent Bluetooth version 4.0 enables synchronization with an unlimited number of mobile communication terminals, and the mobile communication terminal can embrace various electronic devices such as a smart phone or a tablet Personal Computer (PC). The electronic device can transmit and receive a beacon signal when a beacon application program is executed or when a user selects a particular icon of the beacon application program.

In the related art, when receiving a beacon signal from a beacon transmitter (TX) at a particular location, for example, a store or a movie theatre, the electronic device can extract a beacon identifier or a location identifier from the beacon signal, send the beacon identifier or the location identifier to a beacon server using wireless communication, and then download beacon information or location specific information from the beacon server.

As such, when the electronic device wirelessly communicates with the beacon server for every beacon signal reception from the beacon TX of the particular location, current location information of the electronic device can be exposed. As a result, user's privacy is not protected and a communication traffic with the beacon server increases. When the communication with the beacon server is interrupted, a particular function corresponding to the beacon signal cannot be executed.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies of the prior art, it is a primary aspect of the present disclosure to provide a beacon service method of an electronic device and the electronic device thereof, so that various electronic devices such as a smart phone or a tablet Personal Computer (PC) receives beacon information from a beacon server, stores and manages the beacon information therein, and executes a function corresponding to a beacon signal received from a beacon transmitter at a particular location based on the beacon information stored and managed therein.

According to one aspect of the disclosure, a method for use in an electronic device is provided, comprising: receiving, from a server, beacon information including a first function information, wherein the first function information is associated (e.g. grouped, linked, etc.) with a first function; and storing the beacon information in the electronic device so as to perform the first function based on correspondence between a beacon signal to be received from a beacon transmitter and the beacon information.

According to another aspect of the disclosure, an electronic device is provided comprising: a communication module; a memory configured to store a first beacon information for a first function; and at least one processor operatively coupled to the communication module and the memory, configured to: receive a beacon signal from a beacon transmitter; provide the first function when the beacon signal corresponds to the first beacon information; obtain a second beacon information corresponding to the beacon signal, when the beacon signal does not correspond to the first beacon information; and perform a second function corresponding to the second beacon information.

According to yet another aspect of the present disclosure, a method for use in an electronic device is provided, comprising: receiving a beacon signal from a beacon transmitter; executing a first function based on a first beacon information when the beacon signal corresponds to first beacon information; and obtaining, from a server, second beacon information corresponding to the beacon signal, when the beacon signal does not correspond to the first beacon information; and executing a second function based on the second beacon information.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features, and advantages of certain exemplary embodiments of the present disclosure will be more apparent from the following description taken in conjunction with the accompanying drawings, in which:

FIG. 6 is a diagram illustrating an example of advertising parameters, according to an embodiment of the present disclosure;

FIG. 9 is a diagram illustrating an example of beacon information, according to an embodiment of the present disclosure;

FIG. 10 is a diagram illustrating an example of a beacon information list, according to an embodiment of the present disclosure;

Throughout the drawings, like reference numerals will be understood to refer to like parts, components and structures.

DETAILED DESCRIPTION

Figure 1:
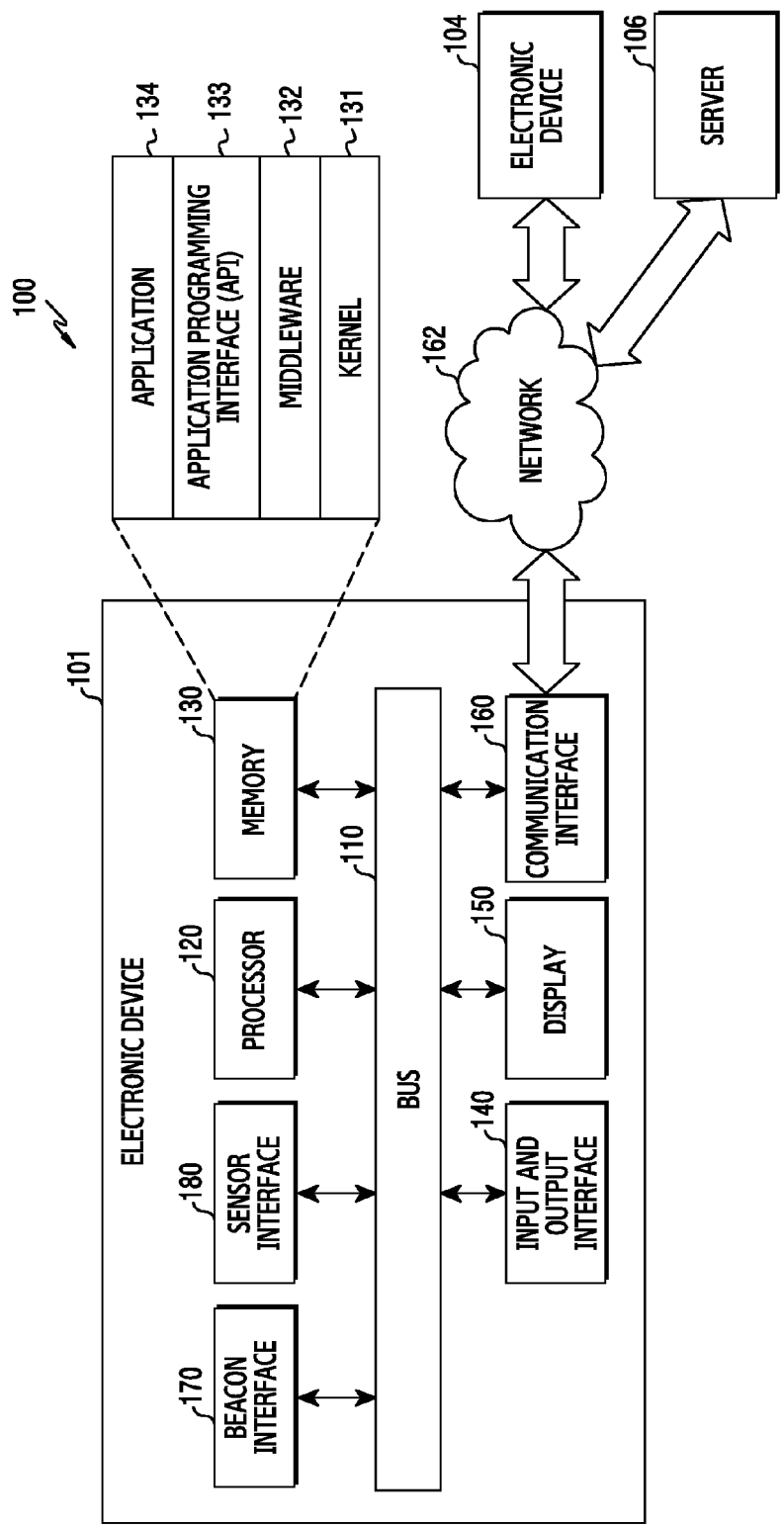
FIG. 1 is a diagram of an example of a network environment including an electronic device, according to an embodiment of the present disclosure.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" at the hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may be a device. For example, the electronic device according to various embodiments of the present disclosure may include at least one of: a smartphone;

a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; a power bank; or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments, an electronic device may be a home appliance. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV); a game console (e.g., Xbox® PlayStation®); an electronic dictionary; an electronic key; a camcorder; or an electronic frame.

In other embodiments, an electronic device may comprise at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global navigation satellite system (GNSS); an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like)

In certain embodiments, an electronic device may comprise at least one of: a piece of furniture or a building/structure; an electronic board; an electronic signature receiving device; a projector; and various measuring instruments (e.g., a water meter, an electricity meter, a gas meter, or a wave meter). Further, it will be apparent to those skilled in the art that an electronic device according to various embodiments of the present disclosure is not limited to the above-mentioned devices.

Herein, the term "user" may indicate a person who uses an electronic device or a device (e.g., an artificial intelligence electronic device) that uses the electronic device.

FIG. 1 is a diagram of an example of a network environment 100 including an electronic device 101, according to an embodiment of the present disclosure. As illustrated, the electronic device 101 may include a bus 110, a processor 120, a memory 130, an input/output interface 150, a display 160, and a communication interface 170. In an embodiment, at least one of the elements of the electronic device 101 may be omitted, or other elements may be additionally included in the electronic device 101.

The beacon interface 170 transmits and receives a beacon signal. The beacon interface 170 can be included in the communication interface 160 or separately constructed. The beacon interface 170 can interwork with the processor 120. The sensor interface 180 receives information from various sensors such as a motion sensor, a location sensor, a fingerprint sensor, an acceleration sensor, a geomagnetic sensor, and a heart rate monitor, and can operate in association with the processor 120.

The bus 110 may include, for example, a circuit that interconnects the elements 110 to 170 and transfers communication (e.g., a control message and/or data) between the elements.

The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. The processor 120 may, for example, perform an operation or data processing on control and/or communication of at least one other element of the electronic device 101.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. In operation, the memory 130 may store, for example, instructions or data (e.g. motion pattern information and motion data) relevant to at least one other element of the electronic device 101. According to an embodiment, the memory 130 may store software and/or a program 140. For example, the program may include a kernel 141, middleware 143, an application programming interface (API) 145, and an application (or application program) 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application 147). Furthermore, the kernel 141 may provide an interface through which the middleware 143, the API 145, or the application 147 may access the individual elements of the electronic device 101 to control or manage the system resources.

The middleware 143, for example, may function as an intermediary for allowing the API 145 or the application 147 to communicate with the kernel 141 to exchange data.

In addition, the middleware 143 may process one or more task requests received from the application 147 according to priorities thereof. For example, the middleware 143 may assign priorities for using the system resources (e.g., the bus 110, the processor 120, the memory 130, or the like) of the electronic device 101, to at least one of the application 147. For example, the middleware 143 may perform scheduling or loading balancing on the one or more task requests by processing the one or more task requests according to the priorities assigned thereto.

The API 145 is an interface through which the applications 147 control functions provided by the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160, for example, may display various types of content (e.g., text, images, videos, icons, or symbols) to the user. The display 160 may include a touch screen and receive, for example, a touch, gesture, proximity, or hovering input using an electronic pen or a body part of a user.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short-range communication 164. The short-range communication 164 may be performed by using at least one of, for example, Wi-Fi, Bluetooth, Near Field Communication (NFC), and Global Navigation Satellite System (GNSS). The GNSS may include at least one of, for example, a Global Positioning System (GPS), a Global navigation satellite system (Glonass), a Beidou navigation satellite system (hereinafter, referred to as "Beidou"), and Galileo (European global satellite-based navigation system). Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard-232 (RS-232), and a Plain Old Telephone Service (POTS). The network 162 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic device 102 and the electronic device 104 or the server 106). According to an embodiment, when the electronic device 101 has to perform some functions or services automatically or in response to a request, the electronic device 101 may make a request for performing at least some functions relating thereto to another device (e.g., the electronic device 102 or the electronic device 104 or the server 106) instead of performing the functions or services by itself or in addition. Another electronic device (e.g., the electronic device 102 or the electronic device 104 or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
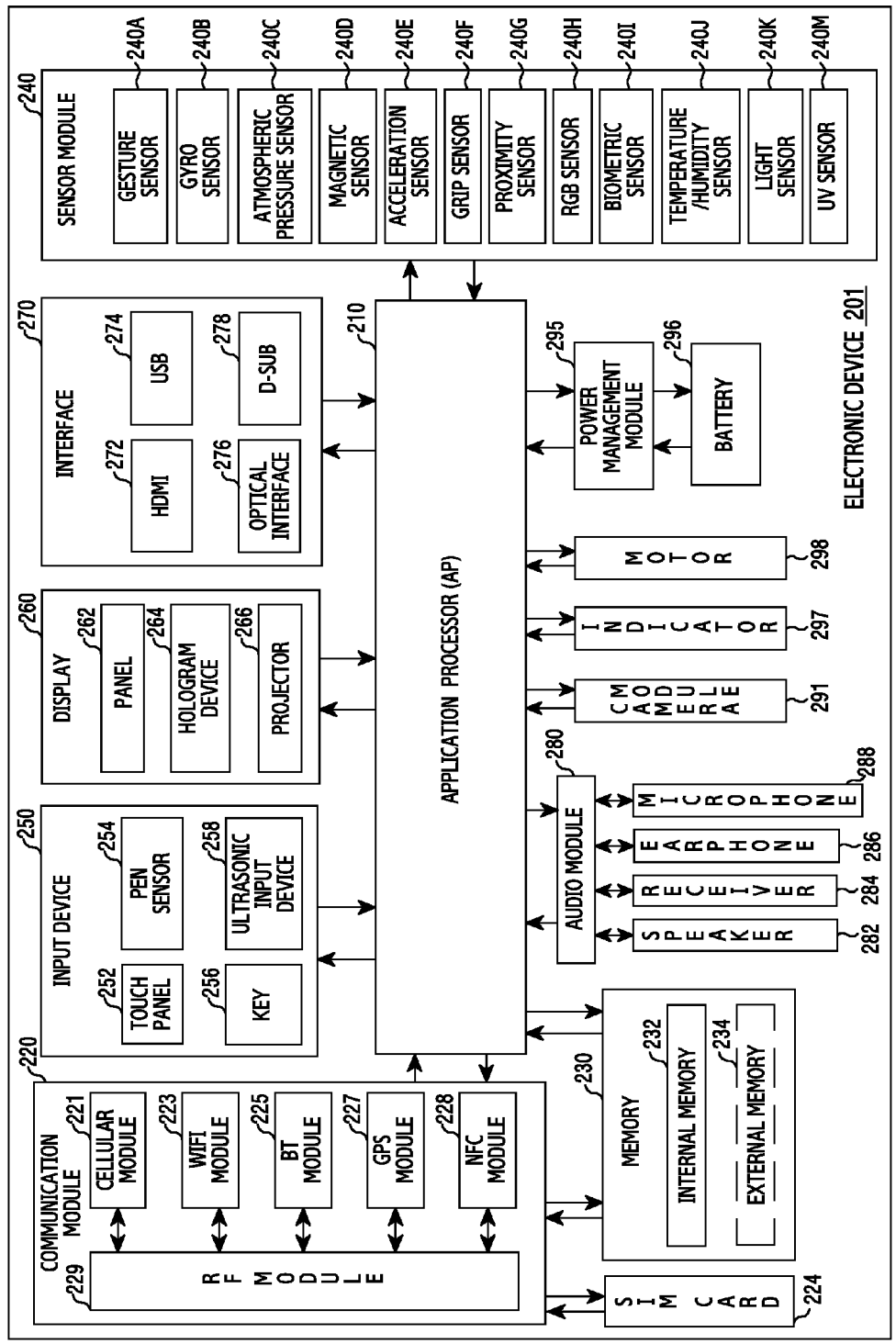
FIG. 2 is a diagram of an example of an electronic device, according to an embodiment of the present disclosure.

FIG. 2 is a diagram of an example of an electronic device 201, according to an embodiment of the present disclosure. As illustrated, the electronic device 201 may comprise, for example, all or a part of the electronic device 101 illustrated in FIG. 1. The electronic device 201 may comprise at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may, for example, control a plurality of hardware or software elements connected thereto and perform a variety of data processing and calculations by driving an operating system or application programs. The AP 210 may be implemented as, for example, a system on chip (SoC). According to an embodiment, the AP 210 may further include a graphic processing unit (GPU) and/or an image signal processor. The AP 210 may include at least some of the elements (e.g., a cellular module 221) illustrated in FIG. 2. The AP 210 may load commands or data, received from at least one other element (e.g., a non-volatile memory), in a volatile memory to process the loaded commands or data, and may store various types of data in the non-volatile memory.

The communication module 220 may have a configuration that is the same as or similar to that of the communication interface 160 of FIG. 1. The communication module 220 may include, for example, a cellular module 221, a Wi-Fi module 223, a BT module 225, a GPS module 227, an NFC module 228, and a radio frequency (RF) module 229. The communication module 220 provides a function of transmitting/receiving a signal. Accordingly, the communication module 220 may be referred to as a "reception unit", a "transmission unit", a "transmission and reception unit", a "communication unit", or the like.

The cellular module 221 may provide, for example, a voice call, a video call, a text message service, or an Internet service through a communication network. According to an embodiment, the cellular module 221 may distinguish and authenticate the electronic device 201 in the communication network by using a subscriber identification module (e.g., the SIM card 224). According to an embodiment, the cellular module 221 may perform at least some of the functions that the AP 210 may provide. According to an embodiment, the cellular module 221 may include a communication processor (CP).

The Wi-Fi module 223, the BT module 225, the GPS module 227, or the NFC module 228 may include, for example, a processor for processing data transmitted/received through the corresponding module. According to an embodiment, at least some (e.g., two or more) of the cellular module 221, the Wi-Fi module 223, the BT module 225, the GPS module 227, and the NFC module 228 may be included in a single integrated chip (IC) or IC package.

The RF module 229 may, for example, transmit/receive a communication signal (e.g., an RF signal). The RF module 229 may include, for example, a transceiver, a power amp module (PAM), a frequency filter, a low noise amplifier (LNA), or an antenna. According to another embodiment, at least one of the cellular module 221, the Wi-Fi module 223, the BT module 225, the GPS module 227, and the NFC module 228 may transmit/receive an RF signal through a separate RF module.

The SIM card 224 may include, for example, a card including a subscriber identification module and/or an embedded SIM, and may further include unique identification information (e.g., an integrated circuit card identifier (ICCID)) or subscriber information (e.g., international mobile subscriber identity (IMSI)).

The memory 230 may include, for example, an internal memory 232 or an external memory 234. The internal memory 232 may include, for example, at least one of a volatile memory (e.g., a dynamic random access memory (DRAM), a static RAM (SRAM), a synchronous dynamic RAM (SDRAM), or the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, or a solid state drive (SSD)).

The external memory 234 may further include a flash drive, for example, a compact flash (CF), a secure digital (SD), a micro secure digital (Micro-SD), a mini secure digital (Mini-SD), an extreme digital (xD), a memory stick, or the like. The external memory 234 may be functionally and/or physically connected to the electronic device 201 through various interfaces.

The sensor module 240 may, for example, measure a physical quantity or detect an operating state of the electronic device 201, and may convert the measured or detected information into an electrical signal. The sensor module 240 may include, for example, at least one of, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor), a bio-sensor 240I, a temperature/humidity sensor 240J, an illumination sensor 240K, and a ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment, the electronic device 201 may further comprise a processor that is configured as a part of the AP 210 or a separate element from the AP 210 in order to control the sensor module 240, thereby controlling the sensor module 240 while the AP 2710 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. In addition, the touch panel 252 may further include a control circuit. The touch panel 252 may further include a tactile layer to provide a tactile reaction to a user.

The (digital) pen sensor 254 may be, for example, a part of the touch panel, or may include a separate recognition sheet. The key 256 may include, for example, a physical button, an optical key, or a keypad. The ultrasonic input device 258 may identify data by detecting acoustic waves with a microphone (e.g., a microphone 288) of the electronic device 201 through an input unit for generating an ultrasonic signal.

The display 260 (e.g., the display 160) may include a panel 262, a hologram device 264, or a projector 266. The panel 262 may include a configuration that is the same as or similar to that of the display 160 of FIG. 1. The panel 262 may be implemented to be, for example, flexible, transparent, or wearable. The panel 262 may be configured as a single module integrated with the touch panel 252. The hologram device 264 may show a stereoscopic image in the air using interference of light. The projector 266 may project light onto a screen to display an image. The screen may be located, for example, in the interior of or on the exterior of the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included in, for example, the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may, for example, convert a sound into an electrical signal, and vice versa. At least some elements of the audio module 280 may be included in, for example, the input/output interface 140 illustrated in FIG. 1. The audio module 280 may, for example, process sound information that is input or output through the speaker 282, the receiver 284, the earphones 286, the microphone 288, or the like.

The camera module 291 may be, for example, a device that may take a still image or a moving image, and according to an embodiment, the camera module 291 may include one or more image sensors (e.g., a front sensor or a rear sensor), a lens, an image signal processor (ISP), or a flash (e.g., an LED or a xenon lamp).

The power management module 295 may, for example, manage power of the electronic device 201. According to an embodiment, the power management module 295 may include a Power Management Integrated Circuit (PMIC), a charger IC, or a battery or fuel gauge. The PMIC may use a wired and/or wireless charging method. Examples of the wireless charging method may include, for example, a magnetic resonance scheme, a magnetic induction scheme, an electromagnetic wave scheme, and the like. Further, the power management module 295 may further include additional circuits (e.g., a coil loop, a resonance circuit, a rectifier, and the like) for wireless charging. The battery gauge may measure, for example, a residual quantity of the battery 296, and a voltage, a current, or a temperature during the charging. The battery 296 may include, for example, a rechargeable battery and/or a solar battery.

The indicator 297 may indicate a specific state of the electronic device 201 or a part thereof (e.g., the AP 210), for example, a booting state, a message state, a charging state, or the like. The motor 298 may convert an electrical signal into a mechanical vibration, and may generate a vibration effect or a haptic effect. Although not illustrated, the electronic device 201 may comprise a processing unit (e.g., a GPU) for mobile TV support. The processing device for mobile TV support may, for example, process media data according to a standard of digital multimedia broadcasting (DMB), digital video broadcasting (DVB), media flow, or the like.

Each of the components of the electronic device according to the present disclosure may be implemented by one or more components and the name of the corresponding component may vary depending on a type of the electronic device. In various embodiments, the electronic device may comprise at least one of the above-described elements. Some of the above-described elements may be omitted from the electronic device, or the electronic device may further comprise additional elements. Further, some of the elements of the electronic device according to various embodiments of the present disclosure may be coupled to form a single entity while performing the same functions as those of the corresponding elements before the coupling.

Now, a beacon service method of an electronic device and the electronic device are elucidated according to various embodiments of the present disclosure. The electronic device can embrace various electronic devices such as a smartphone or a tablet Personal Computer (PC), and include the components of FIG. 1 and FIG. 2.

Figure 3:
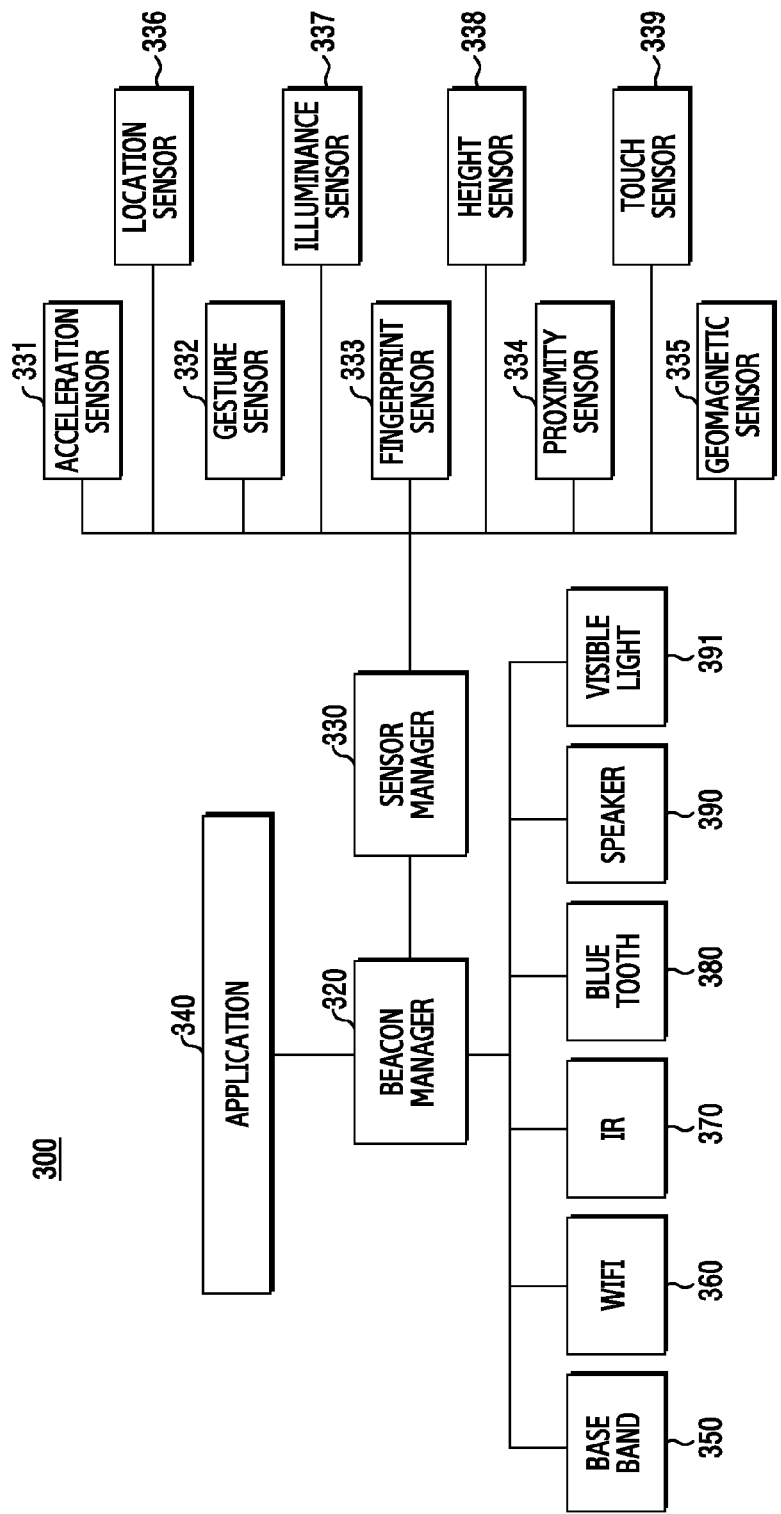
FIG. 3 is a diagram of a part of an electronic device, according to an embodiment of the present disclosure.

FIG. 3 is a diagram of a part of an electronic device 300 according to an embodiment of the present disclosure. The electronic device 300 can include a beacon manager 320, a sensor manager 330, an application 340, a baseband module 350, a Wireless Fidelity (Wi-Fi) module 360, an Infrared (IR) module 370, a Bluetooth module 380, and a speaker 390. The electronic device 300 can further include a visible light module 391 for communication using a visible light (e.g., Light Emitting Diode (LED) light).

The sensor manager 330 can manage various sensors including an acceleration sensor 331, a gesture sensor 332, a fingerprint sensor 333, a proximity sensor 334, a geomagnetic sensor 335, a location sensor 336, an illuminance sensor 337, a height sensor 338, and a touch sensor 339. The sensor manager 330 can be integrated with the beacon manager 320 in a single component, or cooperate as a separate component with the beacon manager 320.

When the application 340 is executed, the beacon manager 320 can drive at least one module (e.g., the baseband module 350). The at least one module can send a beacon signal received over a wireless network to the beacon manager 320. Based on various sensor information fed through the sensor manager 330, the beacon manager 320 can dynamically control the beacon signal transmission and reception.

The beacon manager 320 can control the beacon signal transmission and reception in association with the application 340 or directly create a beacon signal. The beacon manager 320 can be included in the application 340 and manage a beacon operation per application. Alternatively, the beacon manager 320 outside the application 340 may manage the beacon operation of the application 340. The beacon manager 320 may be included in each of the baseband module 350, the Wi-Fi module 360, the IR module 370, the Bluetooth module 380, the speaker 390, and the visible light module 391. The beacon manager 320 can interwork with or be included in the processor 120 of FIG. 1.

The beacon transmission and reception are controlled by a control command generated by the beacon manager 320, and the beacon signal can be transmitted and received through a module capable of sending and receiving the beacon. Herein, the module for sending and receiving the beacon signal can include, for example, the baseband module 350, the Wi-Fi module 360, the IR module 370, the Bluetooth module 380, the speaker 390, or and the visible light module 391.

The baseband module 350 can send and receive a beacon signal communicable over a mobile network such as Global System for Mobile Communications (GSM), Universal Mobile Telecommunications System (UMTS), or Long Term Evolution (LTE). The Wi-Fi module 360 can send and receive a beacon signal in conformity with, for example, 802.11 communication standard.

The IR module 370 can send and receive a beacon signal using, for example, an IR sensor. The Bluetooth module 380 can send and receive a beacon signal in conformity with, for example, a Bluetooth communication standard. The speaker 390 sends and receives a signal using, for example, a sound. The speaker 390 can send and receive a beacon signal containing particular information in an inaudible or audible sound. The beacon signal can be transmitted and received through various modules besides the above-stated modules, and such modules may either send or receive the beacon signal.

When controlling the beacon operation, the beacon manager 320 can make use of various sensor information received from the sensor manager 330. The sensor manager 330 manages sensor values collected from various sensors and utilizes the sensor value with low power.

The sensors managed by the sensor manager 330 can include, for example, the acceleration sensor 331, the geomagnetic sensor 335, a gyro sensor, the location sensor 336 such as a global Positioning Service (GPS), the gesture (e.g., a motion) sensor 332, the illuminance sensor 337, the fingerprint sensor 333, the height sensor 338, the proximity sensor 334, the touch sensor 339, a camera sensor (not shown), a microphone sensor (not shown), a Heart Rate Monitor (HRM) sensor (not shown), an oxygen saturation measuring sensor (not shown), a stress measuring sensor (not shown), and a brainwave sensor (not shown). Various sensors may be managed besides the above-mentioned sensors.

A sensor value can be received from the sensor manager 330. The electronic device 300 may not include the sensor manager 330. In this case, the beacon manager 320 can directly receive a sensor value from each sensor and utilize the sensor value for the beacon operation control.

Figure 4:
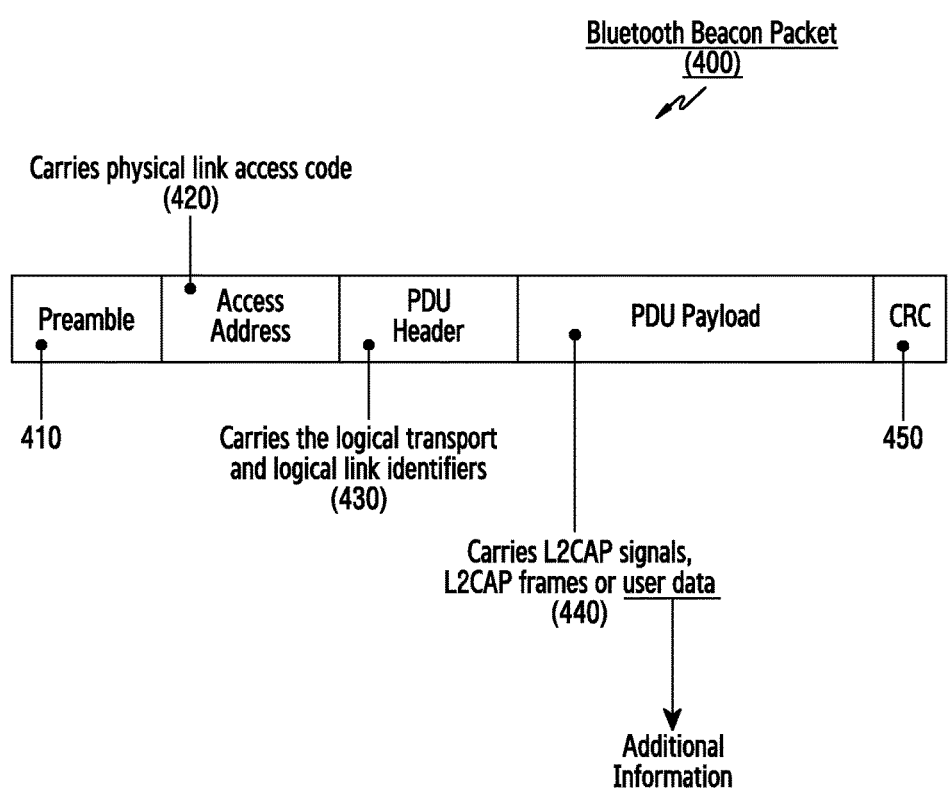
FIG. 4 is a diagram illustrating an example of a beacon packet, according to an embodiment of the present disclosure.

FIG. 4 is a diagram illustrating an example of a beacon packet 400, according to an embodiment of the present disclosure. As illustrated, the beacon packet 400 can include a preamble 410, an access address 420, a Packet Data Unit (PDU) header 430, a PDU payload 440, and a Cyclical Redundancy Check (CRC) 450.

The preamble 410 can contain information regarding frequency synchronization, symbol timing estimation, or automatic gain control. The access address 420 can contain information regarding a physical link access code. The PDU header 430 can contain information regarding logical transport or logical link identifiers.

The PDU payload 440 can contain information regarding a Logical Link Control and Adaptation Protocol (L2CAP) signal, L2CAP frames, or user data. The CRC 450 can contain information regarding data transmission error detection.

The user data can be additional information for the electronic device of a user who visited a particular location such as a venue, a restaurant, or a conference room to further obtain various contents by accessing a particular site or a particular network. The additional information may include as other data than the user data, in the payload of the beacon packet. According to aspects of the disclosure, obtaining the content may include downloading the content, retrieving the content from memory, and/or streaming the content from a remote source.

Figure 5:
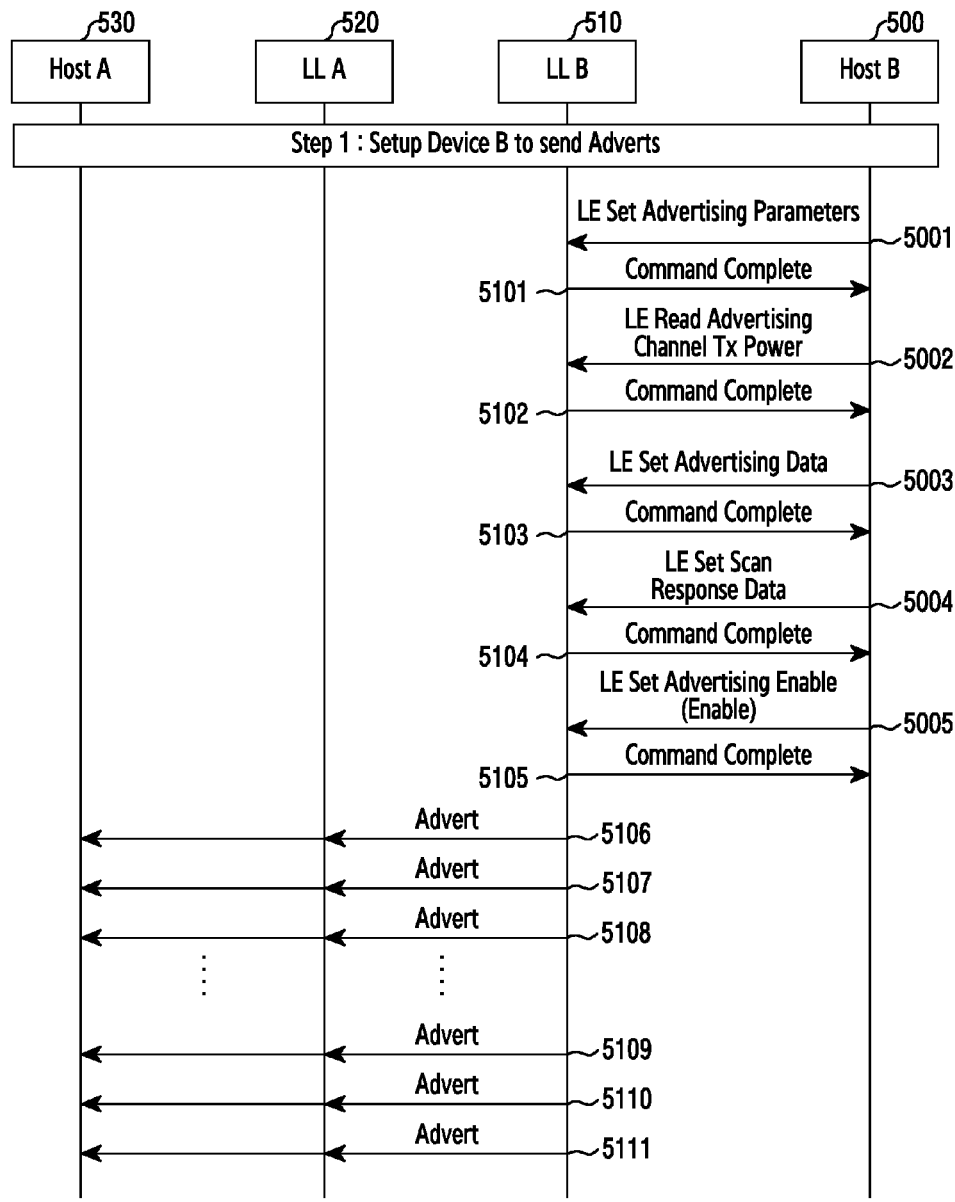
FIG. 5 is a sequence diagram of an example of a beacon signal transmission process, according to an embodiment of the present disclosure.
Figure 7:
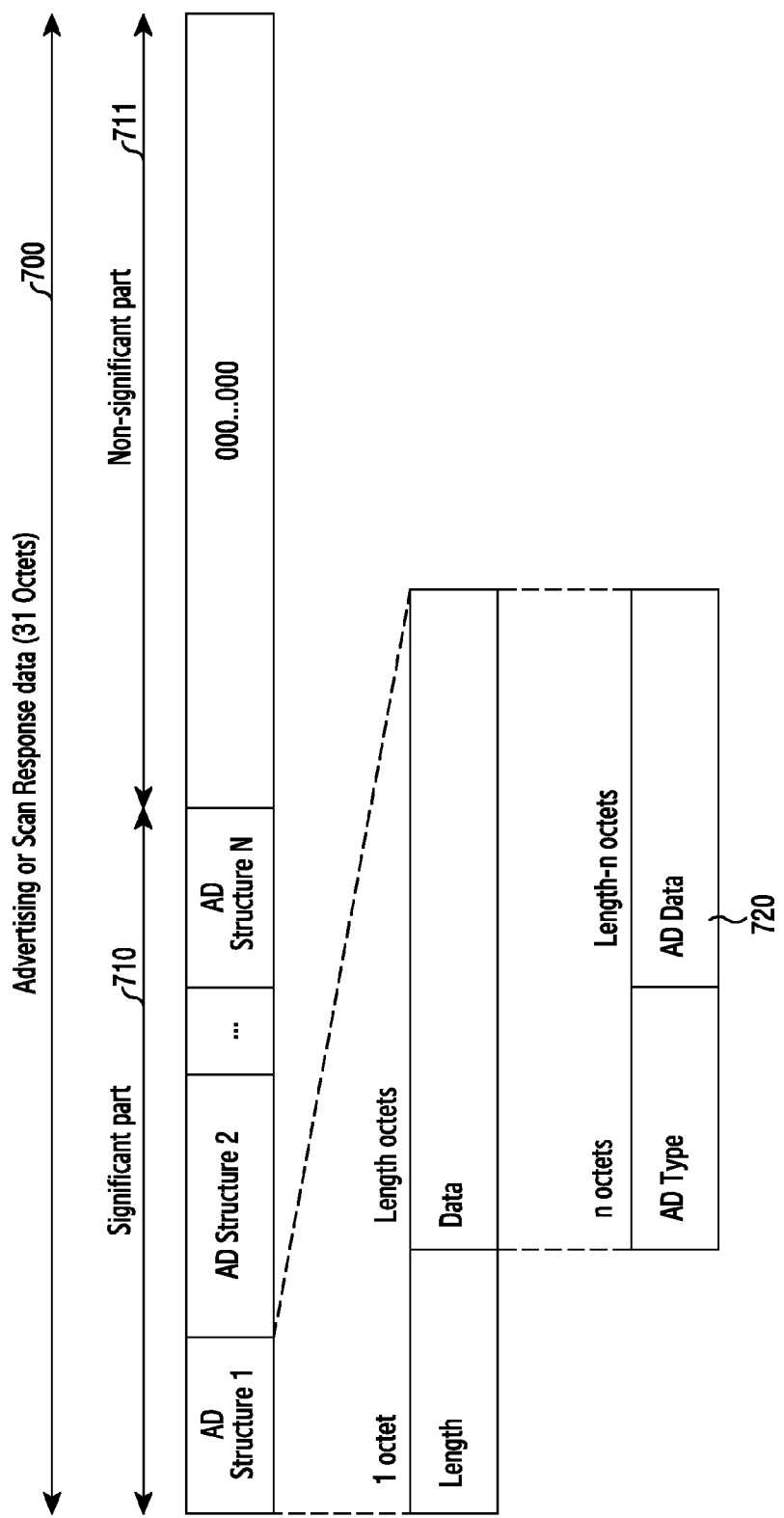
FIG. 7 is a diagram illustrating an example of advertising data, according to an embodiment of the present disclosure.

FIG. 5 is a sequence diagram of an example of a beacon signal transmission process, according to an embodiment of the present disclosure. FIG. 6 depicts set advertising parameters according to an embodiment of the present disclosure. FIG. 7 depicts set advertising data according to an embodiment of the present disclosure.

Referring to FIG. 5, a host B 500 which is one of various types of electronic devices such as a smartphone or a tablet PC can generate and transmit (e.g., advertise) a beacon signal to a host A 530 which is another electronic device.

To generate a beacon signal, the host B 500 (e.g., sequentially) performs operations of set advertising parameters 5001, read advertising channel Tx power 5002, set advertising data 5003, set scan response data 5004, and set advertising enable 5005 on a Link Layer B (LLB) 510 corresponding to a beacon communication module.

The link layer B 510 performs command complete operations 5101-5105 in response to the operations 5001-5005, and performs operations 5106-5111 for transmitting (e.g., advertising) the beacon signal generated as above to a nearby terminal.

The set advertising parameters 5001 sets values included in, for example, advertising parameters. For example, command parameters of FIG. 6 can include advertising interval min field, an advertising interval max field, an advertising type field, an own address type field, a direct address type field, a direct address field, an advertising channel map field, and an advertising filter policy field.

The advertising interval min and max fields can specify a beacon signal transmission interval, and the direct address type field can specify a public device address or a random device address for receiving the beacon signal.

The read advertising channel Tx power 5002 reads a transmit power level used to send an advertising channel packet. The set advertising data 5003 may include data that is transmitted via the beacon signal.

As shown in FIG. 7, advertising or scan response data 700 can include, for example, 31 octects (or bytes). Only a significant part 710 of FIG. 7 can be carried by a beacon signal, and a non-significant part 711 filled with null data to make a data length of 31 octects can be excluded from the transmission. The significant part 710 can include length and data.

AD Data 720 of FIG. 7 can include, for example, service Universally Unique Identifiers (UUIDs), local name, flags, manufacturer specific data, TX power level, security manager Out of Band (OOB), security manager TK value, slave connection interval range, service solicitation, and service data.

The manufacturer specific data can include any suitable type of data that is provided by an electronic device manufacturer. For example, the manufacturer specific data may include advertisements or Uniform Resource Locator (URL) and request advertising start or stop in the set advertising enable 5005.

Figure 8:
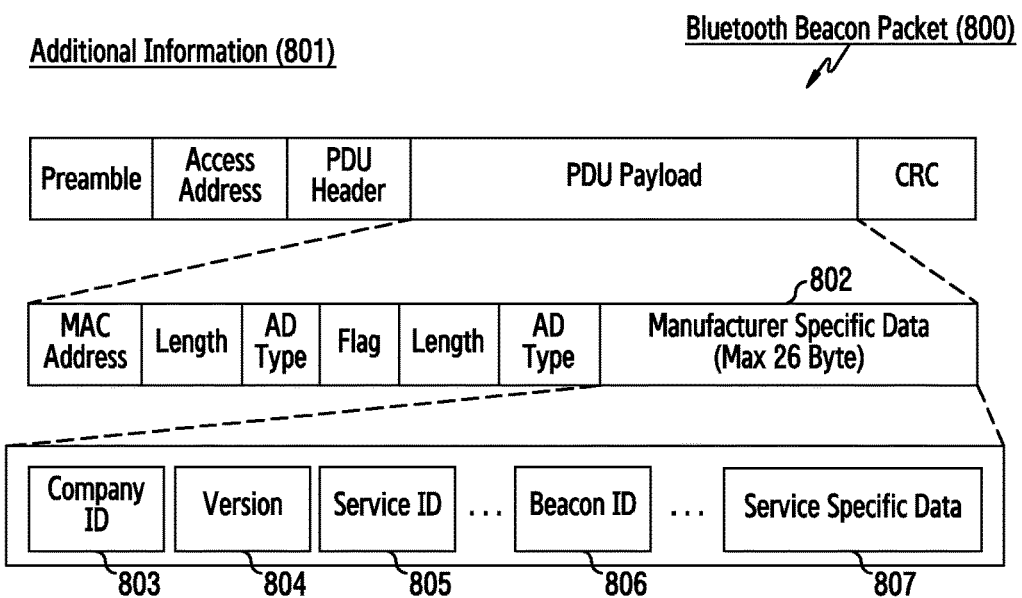
FIG. 8 is a diagram illustrating additional information in a beacon packet, according to an embodiment of the present disclosure.

FIG. 8 is a diagram illustrating additional information in a beacon packet 800, according to an embodiment of the present disclosure. For example, the beacon packet (e.g., a BLE beacon packet) 800 received by the electronic device at a particular location, such as a store or a movie theater can include various additional information 801.

Referring to FIG. 8, the additional information 801 can include manufacturer specific data 802 of the beacon packet 800. The manufacturer specific data 802 can include any suitable type of data, such as one or more of a company Identifier (ID) 803, a version 804, a service ID 805, a beacon ID 806, and service specific data 807.

The company ID 803 can be, for example, an ID of a company which provides a service. For example, when a first company provides a service, the company ID 803 can be a first ID. When a second company provides a service, the company ID 803 can be a second ID.

The version 804 can be, for example, a service version. For example, the service can include a first service and a second service of which at least part is changed (e.g., updated) after the first service is created. In this case, the version 804 of the first service can be a first version. The version 804 of the second service can be a second version.

The service ID 805 can include, for example, an ID of a service provider type or a service type. For example, when the service provider type is a first provider (e.g., a café), the service ID 805 can be a first ID. When the service provider type is a second provider (e.g., a venue), the service ID 805 can be a second ID.

For example, when the service type is a first type (e.g., a service for offering a coupon for a café), the service ID 805 can be a first ID. When the service type is a second type (e.g., a service for providing seat information of a venue), the service ID 805 can be a second ID.

The beacon ID 806 can be, for example, an ID of a beacon transmitter which sends a beacon signal. For example, when a first beacon transmitter sends a beacon signal, the beacon ID 806 can be a first ID. When a second beacon transmitter sends a beacon signal, the beacon ID 806 can be a second ID. The service specific data 807 can be, for example, service related data which is set by a manufacturer which provides a service.

For example, the version 804 and the service ID 805 can be irrelevant to or not directly involved with a current location of the electronic device. The manufacturer specific data 802 can include, example, up to 26 bytes.

FIG. 9 is a diagram illustrating an example of a beacon information 900, according to an embodiment of the present disclosure. As illustrated, the beacon information 900 can include any suitable type of information, such as one or more of a service ID 901, a version 802, a validation date 903, a beacon ID 904, a beacon name 905, action information 906, and display information 907.

For example, when receiving a beacon signal at a particular location, such as a store or a movie theatre, to execute a particular function or to display particular information corresponding to the beacon signal, the electronic device can download the beacon information 900 through wireless communication (e.g., LTE, Wi-Fi) with a beacon server.

For example, displaying the particular information can be one of the particular functions. The beacon information 900 and the beacon server can be referred to as other various names.

The electronic device can update the beacon information 900 with the latest version. For example, the electronic device can extract the version 804 and the service ID 805 from the beacon signal received from the beacon transmitter. The electronic device can send information of the version 804 and the service ID 805 to the beacon server. Hence, based on the version 804 and the service ID 805, the beacon server can be used by the electronic device to obtain the most recent beacon information. The electronic device can update its stored beacon information 900 using the received beacon information updated most recently.

The version 804 and the service ID 805 transmitted to the beacon server can be irrelevant to or not directly involved with a current location of the electronic device. Hence, user's privacy can be protected by preventing the location of the user carrying the electronic device from being exposed.

The service ID 901 of the beacon information can be the same as or similar to the service ID 805 of the beacon signal that corresponds to the beacon information. For example, the service ID 901 can be used to identify a service. For example, the service ID 901 may be uniquely associated with the service.

The version 902 can be the same as or similar to the version 804 of the beacon signal. For example, when service provision information (e.g., beacon information) changes, the version 902 can be used to signal that it is necessary to update the device to a higher version.

The validation date 903 can be a date (or a time or a period) for updating the beacon information. For example, when confirming the beacon information, the electronic device can check the validation date (or time) 903. When a current date is or after the validation date (or time) 903, the electronic device can update the beacon information. The validation date 903 can indicate a date (or a time or a period) for communicating with the server to obtain beacon information. For example, when discovering a new beacon, the electronic device may not communicate with the server to obtain new beacon information corresponding to the discovered beacon until the validation date 903.

The validation date 903 is validation determination information indicating the validation date (or time) of each beacon information. The validation date 903 can be updated by the beacon server and/or the electronic device.

The electronic device can compare the validation date (or time) with the current date (or time), wirelessly communicate with the beacon server in relation to the beacon information which passes the validation date, and download and update beacon information of the latest version. For example, when the service ID of the beacon signal received at a particular location is present in the beacon information list and the validation date relating to the service ID of the beacon information list passes the current date, the electronic device can communicate with the beacon server, and download and update beacon information of the latest version.

When the wireless communication with the beacon server fails, the electronic device can block an unnecessary updating operation from repeating. For example, the electronic device can limit the number of wireless communication attempts with the beacon server to N times (e.g., N=2) per day or limit a wireless communication attempt interval to M hours (e.g., M=12).

The beacon ID 904 can be the same as or similar to the beacon ID 805 of the beacon signal. The beacon ID 904 can be used as, for example, a beacon unique user ID assigned to the beacon to identify a unique user.

The action information 906 can be information identifying (or otherwise associated with) an action (e.g., an operation or a function) to be executed by the electronic device in response to a received beacon signal. For example, upon receiving the beacon signal, the electronic device can perform an operation corresponding to the action 906.

The display information 907 can be information displayed by the electronic device upon receiving a beacon signal. For example, when receiving a beacon signal, the electronic device can display information corresponding to the display information 907 through a display.

The terms of the components of the beacon information 900 can be referred to as other various terms. Other components than the above-stated components may be added to the beacon information or one or more of the components may be omitted.

FIG. 10 is a diagram illustrating an example of a beacon information list 1000, according to an embodiment of the present disclosure. For example, when receiving beacon information from the beacon server, the electronic device can store, update, and manage the beacon information as a beacon control information list in its storage. For example, the storage can be the memory 230 of FIG. 2, and the beacon information list can be referred to as other various names.

Referring to FIG. 10, the beacon information list 1000 can be listed up based on a service ID of beacon information. The beacon information list 1000 can be stored and updated variously, for example, as a lookup table so that a processor (e.g., the processor 120 of FIG. 1) of the electronic device can easily retrieve it.

For example, first beacon information in the beacon information list 1000 can include a service ID "0x03", a version "0x02", a validation date "20150602", a beacon ID "0xDD39E6396F2E9", a beacon name "Samsung TV", an action "remote control ON", and display information "notify remote control found". Second beacon information can include a service ID "0x04", a version "0x01", a validation date "20150710", a beacon ID "0xAB40E637F3E2", a beacon name "Samsung air conditioner", an action "air conditioner ON", and display information "notify air conditioner operating".

Figure 11:
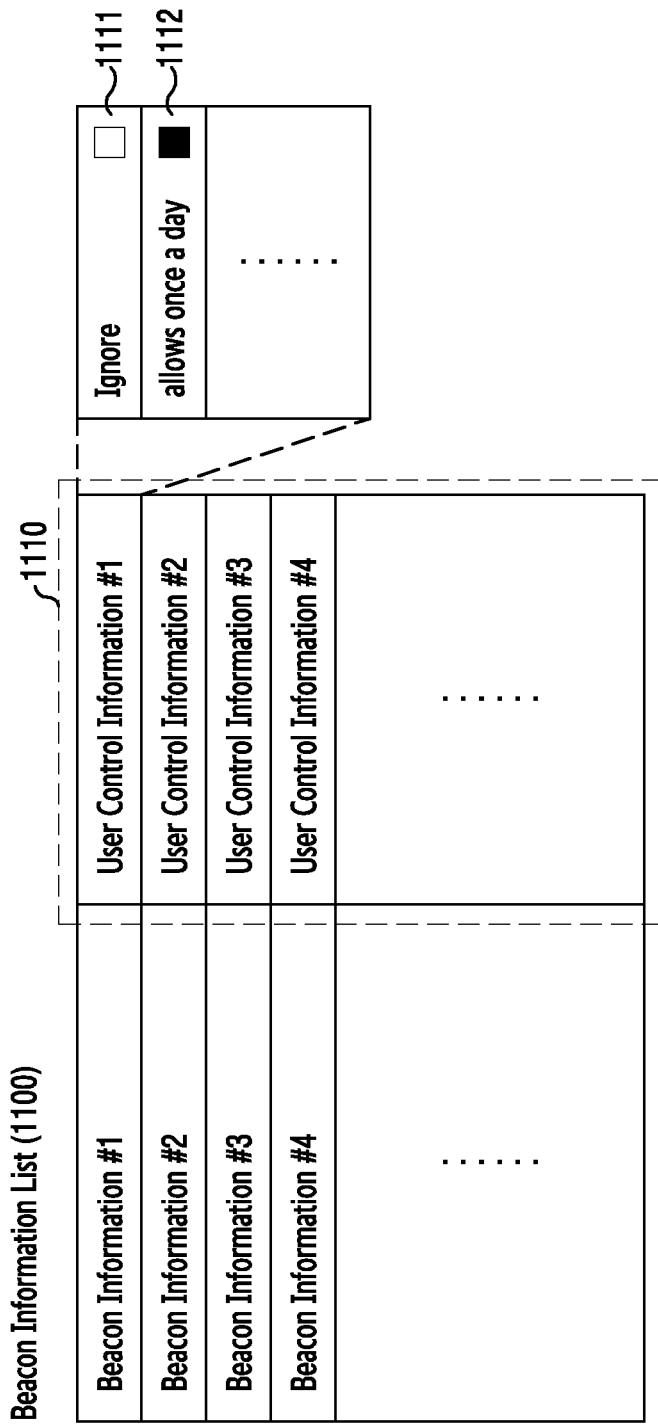
FIG. 11 is a diagram illustrating an example of user control information, according to an embodiment of the present disclosure.

FIG. 11 is a diagram illustrating an example of user control information, according to an embodiment of the present disclosure. The electronic device can associate and store the beacon information with the user control information. For example, the user control information can include information which prevents or otherwise restricts the execution of a particular function that corresponds to the beacon information.

Referring to FIG. 11, the electronic device can store beacon information and user control information in a beacon information list 1100 of a lookup table type. For example, each beacon information can be associated and stored with user control information 1110 which can be arbitrarily set by the user. For example, the beacon information list and the user control information can be managed or updated using one beacon information list.

For example, the user control information can include information 1111 directing to ignore a particular function corresponding to the beacon information. Additionally or alternatively, the user control information can include information 1112 directing to restrictively allow the particular function only a day. Although not depicted, when the same beacon signal is received repeatedly, the user control information may count the number of the repeated receptions and restrict a particular function to an interval of K times (e.g., K=5). The user control information can include information for restricting a particular function in other various manners.

Figure 12:
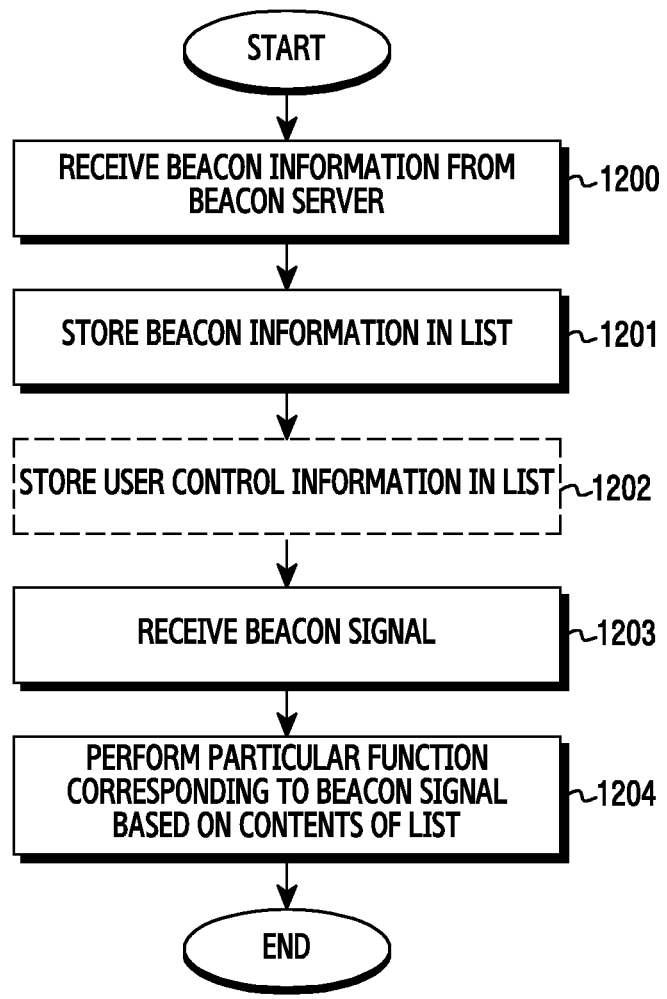
FIG. 12 is a flowchart of an example of a process, according to an embodiment of the present disclosure.

FIG. 12 is a flowchart of an example of a process, according to an embodiment of the present disclosure. According to the process, in operation 1200, the electronic device can receive beacon information from the beacon server through the communication with the beacon server. In operation 1201, the electronic device can store or update the received beacon information in its beacon information list.

In operation 1202, the electronic device can store user control information which can be arbitrarily set by the user, in association with the beacon information list. In operation 1203, the electronic device can receive a beacon signal. For example, the beacon signal may be received when the device enters a particular location, such as a restaurant. In operation 1204, the electronic device can execute a particular function corresponding to the beacon signal based on the beacon information list.

Hence, the electronic device itself can perform a particular function corresponding to a beacon signal based on the beacon information list stored and updated therein.

The electronic device may not perform at least one (e.g., operation 1202) of the operations 1200 through 1204. For example, in operation 1200, the electronic device can receive beacon information from the beacon server. In operation 1201, the electronic device can store the beacon information in the beacon information list. In operation 1203, the electronic device can receive a beacon signal. In operation 1204, the electronic device can perform a particular function corresponding to the beacon signal based on the beacon information list.

Figure 13:
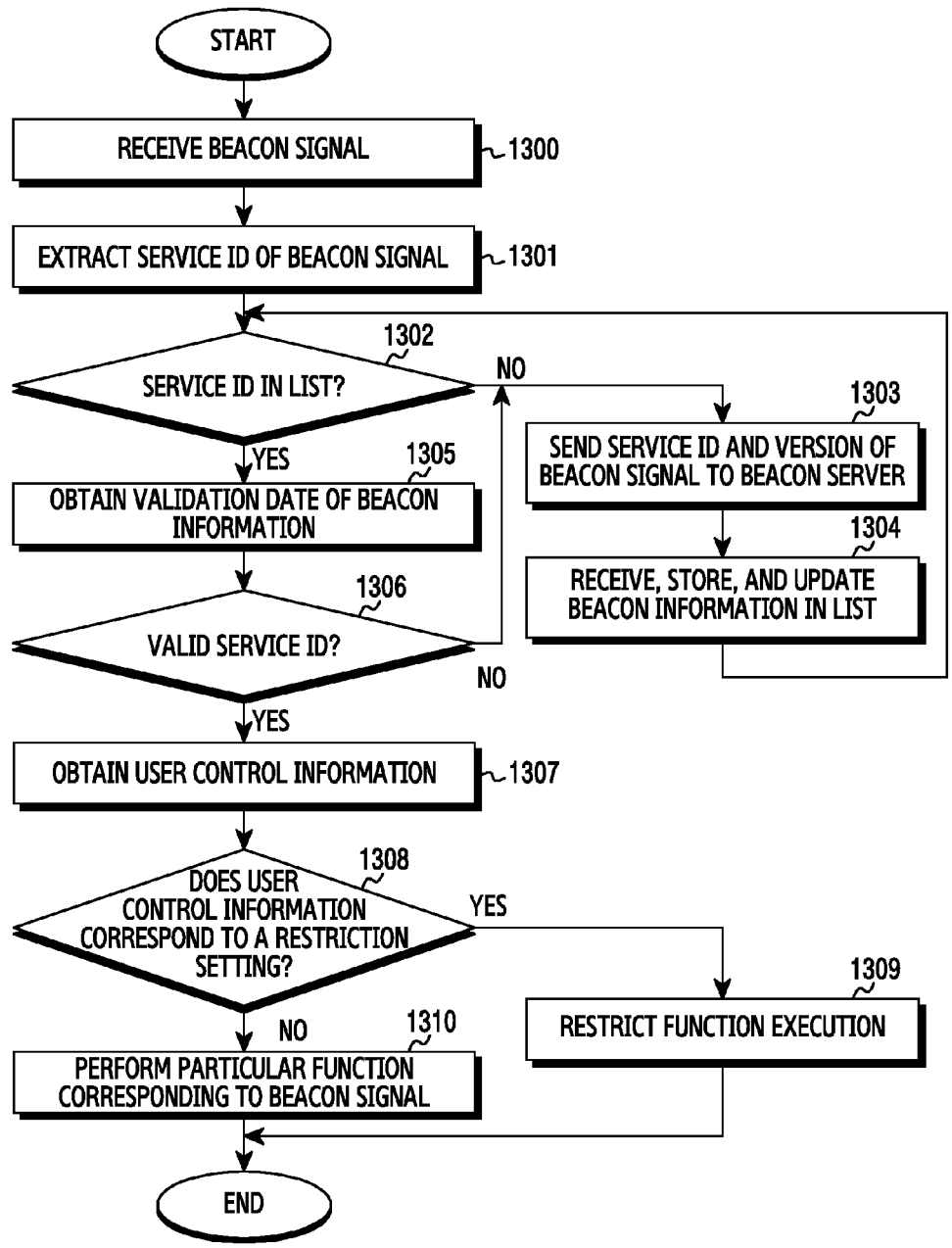
FIG. 13 is a flowchart of an example of a process, according to an embodiment of the present disclosure.

FIG. 13 is a flowchart of an example of a process, according to an embodiment of the present disclosure. According to the process, in operation 1300, the electronic device can receive a beacon signal. For example, the beacon signal may be received when the electronic device enters a particular location, such as a restaurant. In operation 1301, the electronic device can extract a service ID or a version from the received beacon signal.

In operation 1302, the electronic device can determine whether the extracted service ID is included in its stored beacon information list. When the extracted service ID is not in the stored beacon information list, the electronic device can wirelessly transmit the service ID of the received beacon signal to the beacon server in operation 1303. The electronic device can wirelessly transmit the service ID together with the version to the beacon server.

In operation 1304, the electronic device can wirelessly receive beacon information corresponding to the service ID from the beacon server. The electronic device can store or update the received beacon information in the beacon information list.

When the service ID is included in the beacon information list, the electronic device can check a validation date of arbitrary beacon information including the service ID in operation 1305. In operation 1306, the electronic device can determine whether the service ID is valid by comparing the validation date with a current date.

When the current date does not pass the validation date, the electronic device can determine that the service ID is valid in operation 1307. Hence, the electronic device can check user control information associated with the beacon information. By contrast, when the current date passes the validation date, the electronic device can determine that the service ID is not valid in operation 1306 and proceed to the operations 1303 and 1304.

In operation 1308, the electronic device can determine whether the checked user control information corresponds to a restriction setting. When the checked user control information is the restriction setting, the electronic device can restrict particular function execution corresponding to the beacon signal based on the user control information in operation 1309.

When the checked user control information is not the restriction setting, the electronic device can execute a particular function corresponding to the beacon signal based on the beacon information list in operation 1310.

Figure 14:
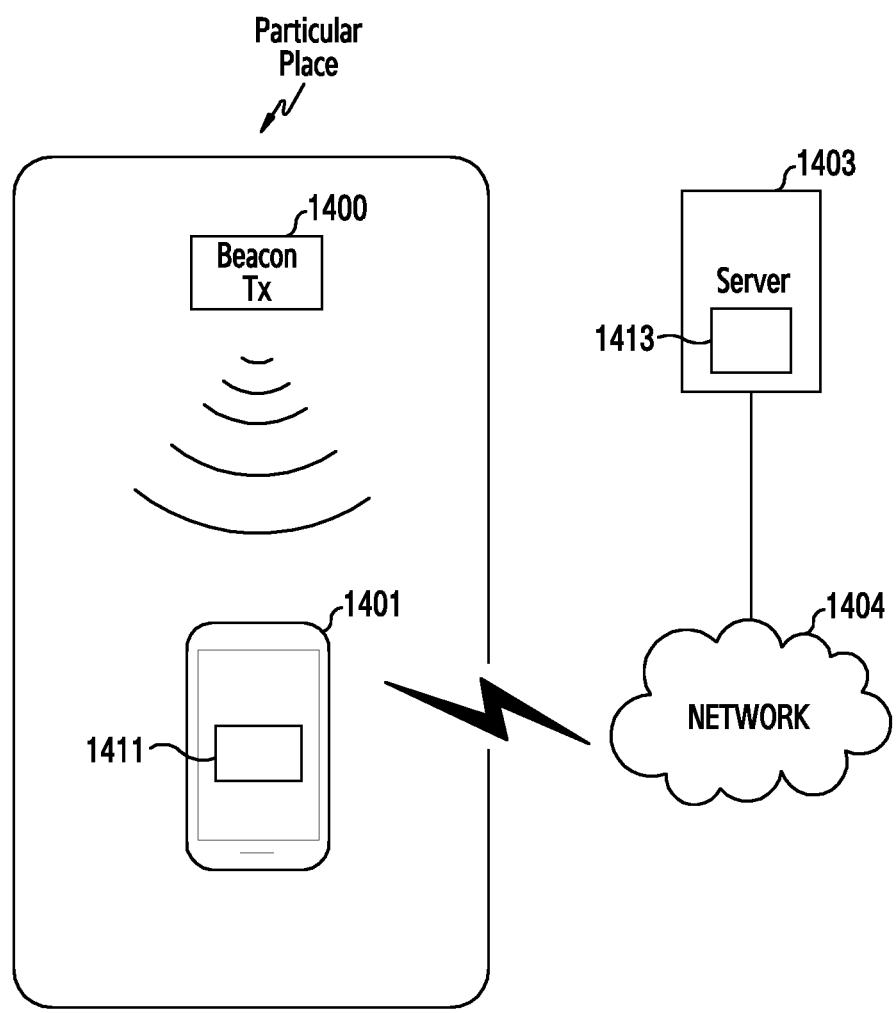
FIG. 14 is a diagram of an example of a system, according to an embodiment of the present disclosure.

FIG. 14 is a diagram of an example of a system, according to an embodiment of the present disclosure. As illustrated, the system may include an electronic device 1401, a server 1403, and a network 1404. In operation, the electronic device 1401 can receive beacon information 1413 from a server 1403 over a network 1404. The electronic device 1401 can store (or add or update) the beacon information 1413 in a beacon information list 1411. When receiving a beacon signal via a beacon transmitter 1400, the electronic device 1401 can perform a function corresponding to the beacon signal based on the beacon information list 1411.

Upon entering a particular location (e.g., a restaurant), the electronic device 1401 can receive a beacon signal from the beacon transmitter 1400 installed at the location.

The electronic device 1401 can extract a service ID from the received beacon signal. The electronic device 1401 can determine whether the extracted service ID is present in the beacon information list 1411. When the extracted service ID exists in the beacon information list, the electronic device 1401 can execute a function corresponding to the service ID based on the beacon information list.

When the extracted service ID exists in the beacon information list, the electronic device 1401 can check a validation date of arbitrary beacon information including the service ID and determine whether a current date passes the validation date.

When the current date passes the validation date, the electronic device 1401 can extract version information from the beacon information and then send the version information together with the service ID to the beacon server 1403 over the network 1404.

The validation date can include, for example, information corresponding to year-month-day, information corresponding to hour-minute-second, or information combining part or all of year-month-day and hour-minute-second. The validation date can be updated by one or more of the electronic device 1401 and the beacon server 1403.

When receiving the version and the service ID from the electronic device 1401 over the network 1404, the beacon server 1403 can provide beacon information of the latest version corresponding to the service ID to the electronic device 1401. The electronic device 1401 can download the beacon information of the latest version from the beacon server 1403, and store and update the beacon information in the beacon information list.

The downloaded beacon information can include, for example, all of the beacon information of the latest version or part of information recently updated. For example, when only part (e.g., action) of various parameters of the beacon information of the latest version is recently updated, the very part can be downloaded to thus enhance data transmission efficiency. In addition, the electronic device 1401 can check a version of the beacon information provided from the beacon server 1403, and refrain from downloading the beacon information when no new version of it is available.

When not normally communicating with the beacon server 1403, the electronic device 1401 can restrict the repeated communication attempt. For example, the electronic device 1401 can limit the number of the communication attempts with the beacon server 1403 to N times (e.g., N=3) and thus block an unnecessary communication attempt from repeating.

For example, when the current date does not pass the validation date, the electronic device 1401 can determine that various parameters of the beacon information are valid. For example, the electronic device 1401 can restrict the execution of a particular function based on the beacon information when the beacon information is successfully validated.

For example, when the user control information associated with the beacon information does not restrict (or prevent) the execution of the particular function, the electronic device 1401 can perform the particular function corresponding to the beacon signal based on the beacon information.

Figure 15:
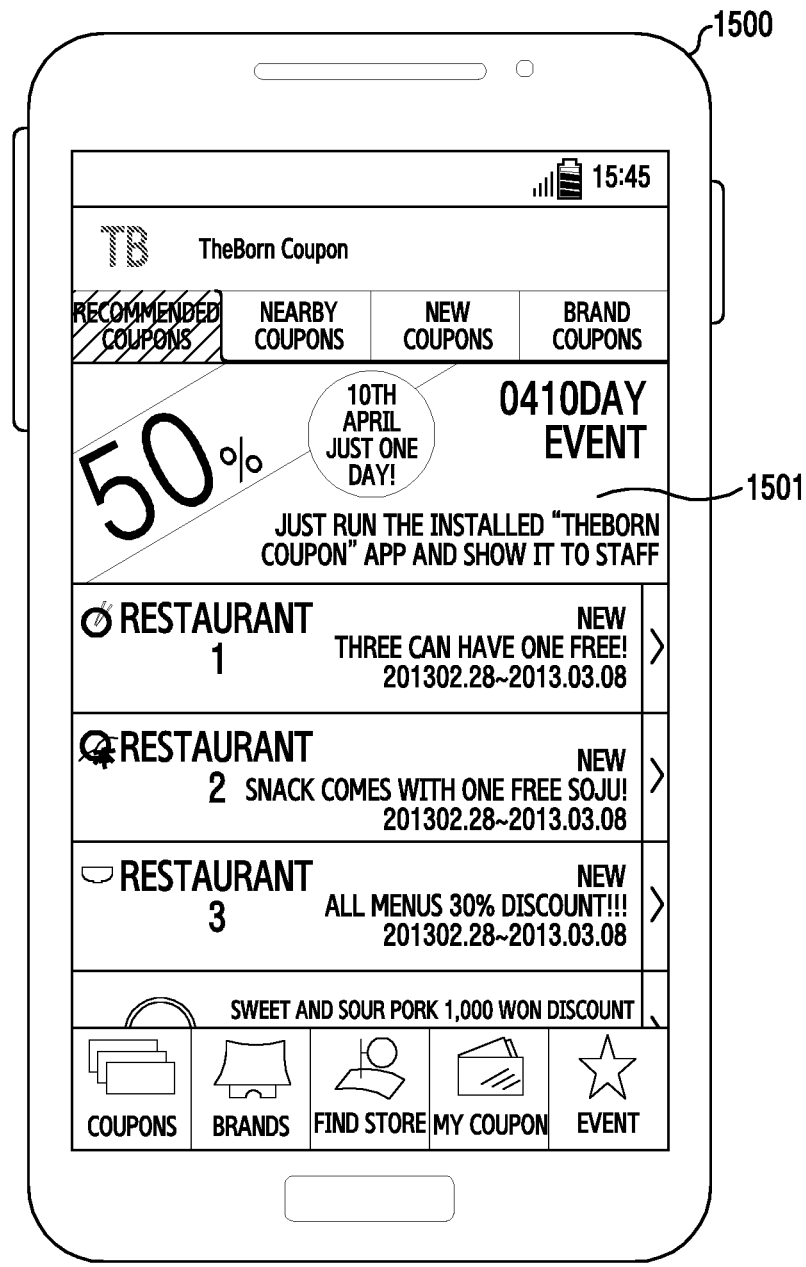
FIG. 15 is a diagram of an example of a user interface, according to an embodiment of the present disclosure.

FIG. 15 is a diagram of an example of a user interface, according to an embodiment of the present disclosure. For example, the user interface may be displayed on an electronic device 1500 when the electronic device 1500 (e.g., a smartphone) is brought to a particular location, such as a restaurant. The user interface may be displayed as a result of the electronic device 1500 executing a particular function corresponding to a beacon signal received in the restaurant. The user interface can display a restaurant discount coupon, and/or any other suitable type of content.

When user control information associated with the beacon information restricts the particular function execution, the electronic device 1500 can restrict the particular function execution corresponding to the beacon signal.

For example, when the user control information directs to ignore the particular function corresponding to the beacon signal, the electronic device 1500 may not perform the particular function. When the user control information directs to restrictively allow the particular function corresponding to the beacon signal only once a day, the electronic device 1500 can perform the particular function only once a day.

In response to the same beacon signal repeatedly received, when the user control information is information for counting the number of the repeated receptions and restricting the particular function to intervals of K times (e.g., K=5), the electronic device 1500 can perform the particular function at intervals of K times. Hence, it is possible to prevent the electronic device 1500 of a user who frequently enters the same location from unnecessarily repeating the particular function corresponding to the same beacon signal.

Figure 16:
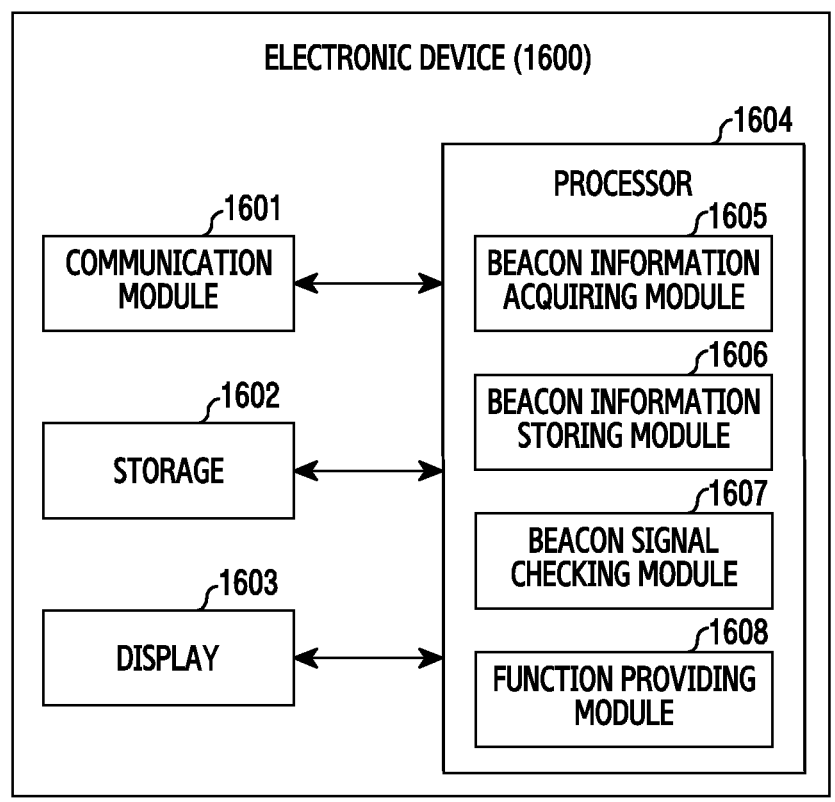
FIG. 16 is a diagram of an example of an electronic device, according to an embodiment of the present disclosure.

FIG. 16 is a diagram of an example of an electronic device 1600, according to an embodiment of the present disclosure. As illustrated, the electronic device 1600 can include a communication module 1601, a storage 1602, a display 1603, and a processor 1604. The communication module 1601 can receive beacon information from a server. The communication module 1601 can include, for example, a Bluetooth (BT) module. For example, the communication module 1601 can request beacon information from the server. The communication module 1601 can receive beacon information from the server in response to the request. The communication module 1601 can receive a beacon signal from a beacon transmitter. For example, the communication module 1601 can listen for beacon signal. Upon detecting the beacon signal, the communication module 1601 can receive the beacon signal.

The storage 1602 may include any suitable type of volatile or non-volatile memory, such as Random-access Memory (RAM), Read-Only Memory (ROM), Network Accessible Storage (NAS), cloud storage, a Solid State Drive (SSD). In operation, the storage 1602 can store the beacon information received through the communication module 1601. The display 1603 can display an image based on the beacon information.

The processor 1604 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. According to the present example, he processor 1604 (e.g., the AP) can include a beacon information acquiring module 1605, a beacon information storing module 1606, a beacon signal checking module 1607, and a function providing module 1608. Each of the modules 1605-1608 can be implemented in hardware, software, and/or a combination of hardware and software.

The beacon information acquiring module 1605 can obtain beacon information from the server through the communication module 1601. The beacon information acquiring module 1605 can obtain beacon information when an application is installed. For example, a café application can be installed on the electronic device 1600. In this case, when receiving a beacon signal in the café, the beacon information acquiring module 1605 can obtain beacon information including information about a function to be offered through the café application.

The beacon information acquiring module 1605 can obtain beacon information at a preset time. For example, the beacon information acquiring module 1605 can automatically obtain beacon information on a periodic basis.

Additionally or alternatively, the beacon information acquiring module 1605 can obtain beacon information based on a user's input. For example, when the user provides input instructing the electronic device to obtain beacon information at 3 p.m., the beacon information acquiring module 1605 can obtain beacon information at 3 p.m. Additionally or alternatively, when the display 1603 displays an icon for receiving beacon information, the electronic device 1600 can detect a user input for the icon. Based on the user input, the beacon information acquiring module 1605 can obtain beacon information.

The beacon information acquiring module 1605 can obtain beacon information based on a location of the electronic device 1600. For example, when the electronic device 1600 is a café, the beacon information acquiring module 1605 can obtain beacon information corresponding to the café. For example, when the electronic device 1600 is in a shopping mall, the beacon information acquiring module 1605 can obtain beacon information corresponding to the shopping mall.

The beacon information acquiring module 1605 can obtain beacon information based on a communication status. For example, when Wi-Fi communications are enabled in the electronic device 1600, the beacon information acquiring module 1605 can obtain beacon information. By contrast, when Wi-Fi communications are disabled in the electronic device, the beacon information acquiring module 1605 may not obtain the beacon information.

When not acquiring beacon information, the beacon information acquiring module 1605 can provide a notification of no beacon information obtained, through, for example, the display 1603.

The beacon information acquiring module 1605 can control the communication module 1601 to receive beacon information through an external electronic device 1600 (e.g., a dongle or a hub).

The beacon information storing module 1606 can store the beacon information acquired by the beacon information acquiring module 1605 in the storage 1602. For example, the beacon information storing module 1606 can store beacon information in a manner that permits the electronic device to later search the beacon information in order to determine whether the beacon information corresponds to the received beacon signal(s).

The beacon information storing module 1606 can update at least part of the beacon information stored in the storage 1602. For example, when an application is updated, the beacon information storing module 1606 can update at least part of the beacon information. For example, the beacon information storing module 1606 can update at least a part of the beacon information based on the preset time, the location of the electronic device 1600, or the communication status. For example, the beacon information storing module 1606 can update at least part of the beacon information based on the user input.

The beacon signal checking module 1607 can determine whether the beacon signal acquired through the communication module 1601 corresponds to the beacon information stored in the storage 1602. For example, the beacon signal checking module 1607 can check the service ID in the beacon signal. The beacon signal checking module 1607 can determine whether the service ID corresponds to a service ID of the beacon information stored in the storage 1602.

The function providing module 1608 can provide a function corresponding to the beacon signal based on the result checked by the beacon signal checking module 1607. When the beacon signal checking module 1607 determines that the beacon signal corresponds to the beacon signal, the function providing module 1608 can provide a function corresponding to the beacon information. For example, the function providing module 1608 can check action information or display information in the beacon information corresponding to the beacon signal. The function providing module 1608 can perform an operation corresponding to the action information or output information corresponding to the display information through the display 1603.

When the beacon signal checking module 1607 does not determine that the beacon signal corresponds to the beacon signal, the function providing module 1608 can confirm a function corresponding to the beacon signal through an external device. For example, when the beacon information corresponds to the beacon signal is not stored in the storage 1602, the function providing module 1608 can send the service ID of the beacon signal to the server. The function providing module 1608 can obtain function information (e.g., action or display information) corresponding to the service ID from the server through the communication module 1601. The function providing module 1608 can provide a function corresponding to the function information. In this case, the function providing module 1608 can store the function information obtained from the server as beacon information, in the storage 1602.

When the beacon signal checking module 1607 detects a plurality of beacon signals, the function providing module 1608 can provide a function corresponding to beacon information corresponding to the beacon signals. For example, the beacon signal checking module 1607 can receive a first beacon signal and a second beacon signal through the communication module 1601. The beacon signal checking module 1607 can identify first and second beacon information corresponding to the first and second beacon signals. In such instances, the function providing module 1608 can provide a function corresponding to at least one of the first and second beacon information.

When it is difficult (or impossible) to provide the function corresponding to the beacon information, for example, the function providing module 1608 can provide a notification through the display 1603. For example, the function corresponding to the beacon information can be a function offered by controlling an external electronic device. When the electronic device 1600 cannot control the external electronic device (e.g., when the electronic device is not functionally connected with the electronic device), the function providing module 1608 can output a notification that the function is unavailable on the display 1603 and/or recommend (or provide) another function.

A method for providing a beacon service can include receiving beacon information comprising function information regarding a function to be offered through the electronic device, from a server, and storing the beacon information in the electronic device so as to perform the function based on correspondence between a beacon signal to be received from a beacon transmitter and the beacon information.

The beacon signal can include manufacturer specific data, and the manufacturer specific data can include at least one of a company ID, a version, a service ID, a beacon ID, and service specific data.

The beacon information can include a service ID, and receiving the beacon information can include sending the service ID to the server and receiving the function information corresponding to the service ID.

The beacon information can include at least one of a service ID, a version, a validation date, a beacon ID, a beacon name, action information, and display information.

The method can further include receiving the beacon signal and when the beacon signal does not correspond to the beacon information, receiving another beacon information corresponding to the beacon signal from the server or another server.

The method can further include updating the beacon information or the function information by at least one of the server and the electronic device.

The method can further include receiving another function information corresponding to another function corresponding to the beacon information based on at least one of a version and a validation date of the beacon information, and storing the another function information in the electronic device based on a correspondence between the beacon signal and the beacon information so as to perform the another function in the electronic device.

The method can further include associating and storing the beacon information with user control information, and restricting function provision corresponding to the beacon information based on the user control information, wherein the user control information is information for controlling an operation which provides the function.

The method can further include, when the beacon signal corresponds to the beacon information, performing a function corresponding to the beacon signal based on a validation date of the beacon information and user control information.

An electronic device for providing a beacon service can include a communication module, a storage for storing first beacon information for a first function to be offered in the electronic device, and a processor for functionally interworking with the communication module and the storage. The processor can receive a beacon signal from a beacon transmitter, when the beacon signal corresponds to the first beacon information, provide the first functions, and when the beacon signal does not correspond to the first beacon information, obtain second beacon information corresponding to the beacon signal from a server and provides a second function corresponding to the second beacon information.

The processor can store the second beacon information in the storage, and update the first beacon information on a periodic basis or according to a communication status, or first beacon information received at a different location in the storage.

The beacon signal can include a service ID, and the processor can confirm the beacon information corresponding to the beacon signal based on the service ID.

The beacon signal can include manufacturer specific data, and the manufacturer specific data can include at least one of a company ID, a version, a service ID, a beacon ID, and service specific data.

The processor can control the communication module to send a service ID and a version of the beacon signal to the beacon server and then to receive beacon information from the beacon server.

The beacon information can include at least one of a service ID, a version, a validation date, a beacon ID, a beacon name, action information, and display information, and the validation date can be updated by at least one of the beacon server and the electronic device.

When a service ID of a beacon signal received at a particular location is not in the storage, the processor can control the communication module to request the beacon information through wireless communication with the beacon server. The processor can update beacon information received afterward based on at least one of a version and a validation date of the beacon information.

The processor can control the storage to store the beacon information in association with user control information, the user control information is user setting information for restricting function execution corresponding to the beacon information, and the processor can restrict a function corresponding to the beacon information based on the user control information.

When a service ID of a beacon signal received at a particular location is in the storage, the processor can perform a function corresponding to the beacon signal based on a validation date of beacon information associated with the service ID and user control information.

An operating method of an electronic device can include receiving a beacon signal from a beacon transmitter, when the beacon signal corresponds to first beacon information stored in the electronic device, providing the first function based on the first beacon information, and when the beacon signal does not correspond to the beacon information, obtaining second beacon information corresponding to the beacon signal from a server and providing a second function based on the second beacon information.

As set forth above, the electronic device itself can perform a particular function corresponding to a received beacon signal based on beacon information stored and managed therein, without having to communicate with the beacon server.

The communication between the electronic device and the beacon server can be minimized, and the communication with the beacon server is conducted based on the service ID of the beacon signal which does not expose the location information of the electronic device. Thus, the privacy of the user carrying the electronic device can be protected.

The beacon information stored and managed in the electronic device is associated and stored with various user control information. For example, the same particular function corresponding to a beacon signal received in every entry into a particular location can be prevented from unnecessarily repeating.

In addition, the electronic device records and includes the validation determination information such as a validation date in the beacon information stored and managed. Thus, the beacon information can be updated with the latest version, and the electronic device can avoid a function which passed the validation date.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a program module form. The instruction, when executed by a processor (e.g., the processor 120), may cause the one or more processors to execute the function corresponding to the instruction. The computer-readable storage medium may be, for example, the memory 130.

Any of the modules or programming modules according to various embodiments of the present disclosure may include at least one of the above-described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. A method for use in an electronic device, comprising:
receiving, by at least one processor of the electronic device, from a server, first beacon information including information on a first service identity (ID) and a first function to be performed in the electronic device, through a communication interface of the electronic device;
storing, by the at least one processor, the first beacon information in a memory of the electronic device, wherein the first service ID is stored in association with the first function;
after storing the first beacon information, receiving, by the at least one processor, a beacon signal including a second service ID from an external beacon transmitter, through the communication interface;
identifying, by the at least one processor, whether the second service ID corresponds the first service ID;
in response to identifying that the first service ID corresponds the second service ID, performing the first function;
identifying, based on a validation date included in the first beacon information, whether the first service ID is valid; and
transmitting the first service ID to the server to update the first beacon information in response to identifying that the first service ID is invalid and the first service ID corresponds the second service ID.

2. The method of claim 1, wherein the beacon signal further comprises at least one of a company identifier (ID), a version, a beacon ID, and service specific data.

3. The method of claim 1, wherein receiving the first beacon information comprises:
transmitting, to the server, the first service ID; and
in response to transmitting the first service ID, receiving the first beacon information corresponding to the first service ID.

4. The method of claim 1, wherein the first beacon information further comprises at least one of a version, a validation date, a beacon ID, a beacon name, and display information.

5. The method of claim 1, further comprising:
in response to identifying that the first service ID does not correspond the second service ID, transmitting the second service ID to the server; and
receiving a second beacon information corresponding to the second service ID from the server.

6. The method of claim 1, further comprising updating at least one of the first beacon information by the electronic device.

7. The method of claim 1, further comprising:
identifying, based on a validation date included in the first beacon information, whether the first service ID is valid,
wherein performing the first function comprises:
performing the first function in response to identifying that the first service ID is valid and the first service ID corresponds the second service ID.

8. The method of claim 1, further comprising
storing user control information in the electronic device; and
restricting the first function based on the user control information.

9. An electronic device comprising:
a communication interface;
a memory; and
at least one processor operatively coupled to the communication interface and the memory, the at least one processor configured to:
receive, from a server, first beacon information including information on a first service identity (ID) and a first function to be performed in the electronic device, through the communication interface;
storing the first beacon information in the memory, wherein the first service ID is stored in association with the first function;
after storing the first beacon information, receive a beacon signal including a second service ID from an external beacon transmitter through the communication interface;
identify whether the second service ID corresponds the first service ID;
in response to identifying that the first service ID corresponds the second service ID, perform the first function;
identify, based on a validation date included in the first beacon information, whether the first service ID is valid; and
transmit the first service ID to the server to update the first beacon information in response to identifying that the first service ID is invalid and the first service ID corresponds the second service ID.

10. The electronic device of claim 9, wherein the at least one processor is further configured to:
in response to identifying that the first service ID does not correspond the second service ID, transmit the second service ID to the server; and
receive a second beacon information corresponding to the second service ID from the server.

11. The electronic device of claim 9, wherein the beacon signal further comprises at least one of a company ID, a version, a beacon ID, and service-specific data.

12. The electronic device of claim 9, wherein the at least one processor is further configured to:
transmit, to the server, the first service ID; and
in response to transmitting the first service ID, receive the first beacon information corresponding to the first service ID.

13. The electronic device of claim 9, wherein the first beacon information further comprises at least one of a version, a validation date, a beacon ID, a beacon name, action information, and display information, and the validation date is updated by at least one of the server and the electronic device.

14. The electronic device of claim 9, wherein, when the second service ID is not stored in the memory, the at least one processor is further configured to cause the communication interface to request a second beacon information corresponding to the second service ID to the server.

15. The electronic device of claim 9, wherein the at least one processor is configured to update the first beacon information based on at least one of a version and a validation date of the first beacon information.

16. The electronic device of claim 9, wherein the at least one processor is further configured to store user control information in the memory, and restrict the first function based on the user control information.

17. The electronic device of claim 9, wherein, the at least one processor is further configured to:
  identify, based on a validation date included in the first beacon information, whether the first service ID is valid,
  perform the first function in response to identifying that the first service ID is valid and the first service ID corresponds the second service ID.

18. The electronic device of claim 9, wherein the first service ID is unrelated to a current location of the electronic device.

* * * * *